US010266130B2

(12) United States Patent
Saito et al.

(10) Patent No.: US 10,266,130 B2
(45) Date of Patent: Apr. 23, 2019

(54) CIRCUIT FOR VEHICLE

(71) Applicant: Yazaki Corporation, Tokyo (JP)

(72) Inventors: Yasuyuki Saito, Makinohara (JP);
Noriaki Sasaki, Makinohara (JP);
Yukinari Naganishi, Makinohara (JP);
Taku Furuta, Makinohara (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 16/042,678

(22) Filed: Jul. 23, 2018

(65) Prior Publication Data

US 2018/0326928 A1 Nov. 15, 2018

Related U.S. Application Data

(63) Continuation of application No. PCT/JP2017/003489, filed on Jan. 31, 2017.

(30) Foreign Application Priority Data

Feb. 2, 2016 (JP) .................................. 2016-018403

(51) Int. Cl.
*H01R 13/66* (2006.01)
*B60R 16/02* (2006.01)
(Continued)

(52) U.S. Cl.
CPC ........ *B60R 16/0215* (2013.01); *B60R 16/023* (2013.01); *B60R 16/03* (2013.01); *H01R 9/031* (2013.01); *H02G 3/16* (2013.01)

(58) Field of Classification Search
CPC combination set(s) only.
See application file for complete search history.

(56) References Cited

U.S. PATENT DOCUMENTS 4,815,984 A * 3/1989 Sugiyama ........... B60R 16/0239
174/72 A
4,940,419 A * 7/1990 Kurita ................. H01R 13/5213
439/271
(Continued)

FOREIGN PATENT DOCUMENTS

EP 0791506 A2 8/1997
JP 558230 A 3/1993
(Continued)

OTHER PUBLICATIONS

Written Opinion (PCT/ISA/237) issued by the International Searching Authority in corresponding International Application No. PCT/JP2017/003489, dated Apr. 25, 2017.
(Continued)

*Primary Examiner* — William H. Mayo, III
*Assistant Examiner* — Krystal Robinson
(74) *Attorney, Agent, or Firm* — Sughrue Mion, PLLC

(57) ABSTRACT

According to the present invention, an additional component circuit body, the structure of which changes in accordance with the type of vehicle or options, and a first base circuit body, the structure of which is fixed, are produced separately, and a whole circuit is configured by combining said circuit bodies. The additional component circuit body has a backbone structure, which is configured such that various branch lines can be attached/detached thereto/therefrom, and a branch line. A main line and the branch line include a power supply line and a communication line. The additional component circuit body has a superordinate control unit and subordinate control unit that control the power supplied to an electrical component that is connected to each branch line. The invention has a switching circuit for switching the connection state of each terminal. Supplied power is con-
(Continued)

trolled by switching the terminals to which power is supplied.

5 Claims, 10 Drawing Sheets

(51) Int. Cl.
*H02G 3/16* (2006.01)
*B60R 16/023* (2006.01)
*B60R 16/03* (2006.01)
*H01R 9/03* (2006.01)

(56) References Cited

U.S. PATENT DOCUMENTS

| | | | | |
|---|---|---|---|---|
| 5,252,091 A * | 10/1993 | Fujita | ............... | H01R 25/14 439/499 |
| 5,435,747 A * | 7/1995 | Franckx | ............ | H01R 4/2433 439/409 |
| 5,623,169 A | 4/1997 | Sugimoto et al. | | |
| 5,690,505 A * | 11/1997 | Hirata | ............... | H01R 4/2433 439/402 |
| 5,903,156 A * | 5/1999 | Matsumaru | ............ | G01R 31/11 324/503 |
| 6,083,015 A * | 7/2000 | Vargas | ............... | B60R 16/0215 439/130 |
| 6,170,152 B1 * | 1/2001 | Ohta | ............... | H01R 43/01 29/33 M |
| 6,635,824 B1 * | 10/2003 | Oka | ............... | H01R 9/226 174/72 B |
| 7,179,101 B2 * | 2/2007 | Murakami | ............ | H01R 4/2433 439/142 |
| 2002/0019165 A1 | 2/2002 | Aoki et al. | | |
| 2010/0218976 A1 * | 9/2010 | Suzuki | ............... | B60R 16/0215 174/135 |
| 2015/0349471 A1 * | 12/2015 | Maki | ............... | H01R 13/6691 307/10.1 |
| 2015/0360627 A1 | 12/2015 | Sasaki et al. | | |

FOREIGN PATENT DOCUMENTS

| | | | |
|---|---|---|---|
| JP | 6171438 A | | 6/1994 |
| JP | 794251 A | | 4/1995 |
| JP | 9325932 A | | 12/1997 |
| JP | 2001219797 A | | 8/2001 |
| JP | 200258151 A | | 2/2002 |
| JP | 2003175781 A | | 6/2003 |
| JP | 2003305909 A | | 10/2003 |
| JP | 2003309509 A | | 10/2003 |
| JP | 2005078962 A | | 3/2005 |
| JP | 2015020579 A | | 2/2015 |
| JP | 2015227088 A | | 12/2015 |
| JP | 2015227089 A | | 12/2015 |
| JP | 201615809 A | | 1/2016 |
| JP | 2016004687 A | | 1/2016 |
| JP | 2016015809 A | * | 1/2016 |

OTHER PUBLICATIONS

International Search Report (PCT/ISA/210), issued by International Searching Authority in corresponding International Application No. PCT/JP2017/003489, dated Apr. 25, 2017.
Communication dated Feb. 27, 2018, from the Japanese Patent Office in counterpart application No. 2016-018403.
English Translation of Written Opinion dated Apr. 25, 2017, issued by the International Searching Authority in counterpart International Patent Application No. PCT/JP2017/003489 (PCT/ISA/237).

* cited by examiner

CIRCUIT FOR VEHICLE

CROSS REFERENCE TO RELATED APPLICATIONS

This application is a continuation of PCT application No. PCT/JP2017/003489, which was filed on Jan. 31, 2017 based on Japanese patent application No. 2016-018403 filed on Feb. 2, 2016, whose contents are incorporated herein by reference. Also, all the references cited herein are incorporated as a whole.

BACKGROUND OF THE INVENTION

1. Technical Field

The present invention relates to a circuit for a vehicle, that is routed on the vehicle.

2. Background Art

On a vehicle, it is necessary that source power be appropriately supplied to each of an enormous number of various electric components, for example, from an alternator (generator) or a battery which is the main power source. Moreover, in a system used for the supply of source power like this, it is necessary that the following functions be also provided: the function of switching between ON and OFF of power supply as required; and the function for shutting off current for each route when excess current flows through electric components.

On a general vehicle, a wire harness which is an assembly of a multiplicity of electric wires is routed on the vehicle, and through this wire harness, the main power source and the electric components of each portion are interconnected to supply power. Moreover, it is typical to use a junction box to distribute the source power to a plurality of routes, use a relay box to control ON and OFF of the power supply for each route and use a fuse box to protect the electric wires and loads of the wire harness.

The wire harness shown in JP-A-2005-78962 is provided with a network transmission path, a power source and GND, and a circuit for supplying other signals. Moreover, this wire harness is provided with a wire harness trunk line, a sub wire harness, an optional sub wire harness and a network hub device.

SUMMARY

In recent years, there has been a tendency that the structure of the above-described wire harness routed on the vehicle body is complicated with an increase in the number of electric components mounted on vehicles. Therefore, by combining the wire harness trunk line, the sub wire harness and the optional wire harness as in JP-A-2005-78962, a wire harness having a complicated shape as a whole is structured to enable connection to various electric components disposed in various positions on the vehicle body.

Moreover, there has been a tendency that the wire harness increases in overall size and weight since the electric wires constituting the wire harness increase in diameter and the number of electric wires increases with an increase in the number of electric components mounted on the vehicle body. Moreover, since the numbers of kinds and article numbers of wire harnesses to be manufactured increase according to the difference in the type of the vehicle to be mounted with the wire harnesses and with an increase in the kinds of optional electric components mounted on the vehicle, it is difficult to commonalize the parts constituting the wire harnesses, so that part cost and manufacturing cost are increased. Moreover, if the overall structure of the wire harness is complicated, there are cases where the manufacture of the wire harness is difficult and where the work at the assembly of the wire harness to the vehicle body is difficult.

The present invention is made in view of the above-described circumstances, and an object thereof is to provide a circuit for a vehicle capable of facilitating manufacture and reducing the size and the weight by simplifying the structure for electric connections between various electric components and the power source on the vehicle and between the electric components.

Means for Solving the Problems

To attain the above-mentioned object, a circuit for a vehicle according to the present invention is characterized by the following (1) to (6):

(1) A circuit for a vehicle routed on a vehicle, comprising:
a first circuit having a trunk line and a branch line detachably attachable to the trunk line; and
a second circuit having a plurality of electric wires,
wherein the trunk line and the branch line respectively include power supply lines and communication lines.

(2) The circuit for a vehicle according to the above (1),
wherein the first circuit has
a branch portion for connecting the branch line to the trunk line, the branch portion including a lower level control portion; and
a higher level control portion that is connected to the trunk line, controls distribution of power to be supplied to the branch line based on communication with the lower level control portion and controls the lower level control portions.

(3) The circuit for a vehicle according to the above (2),
wherein to the branch portion, a plurality of the branch lines are connectable in parallel, and
the lower level control portion has a switching circuit that switches connection between the power supply lines and the communication lines of the trunk line and the branch lines according to the power to be supplied to an accessory connected to the connected branch line.

(4) The circuit for a vehicle according to the above (3),
wherein the switching circuit has one or more than one selecting switch device that selectively interconnects any one of a power supply terminal capable of power supply, a ground terminal connectable to a ground line and a communication terminal connectable to the communication lines and one common terminal of the trunk line; and a programmable control device that controls at least a connection condition of the communication terminal.

(5) The circuit for a vehicle according to the above (4),
wherein the switching circuit includes switching elements that control power supply to the power supply terminal, and
the control device controls the switching elements according to the power to be supplied to the accessory connected to each of the branch lines.

(6) The circuit for a vehicle according to the above (1),
wherein the first circuit is an optional circuit selected according to a plurality of vehicle types, grades or options, and
the second circuit is a standard circuit used commonly to a plurality of vehicle types, grades or options.

According to the circuit for a vehicle of the structure of the above (1), since the first circuit and the second circuit can be separately manufactured as constituents that are independent of each other, the structure can be simplified, and further, manufacture can be facilitated. Moreover, since the first circuit is formed of the trunk line and the detachably attachable branch lines, the trunk line and the branch lines can also be separately manufactured as constituents that are independent of each other. Moreover, even when the shape and structure of the trunk line is simple, a routing configuration that is complicated as a whole can be realized by coupling the branch lines to the trunk line. Moreover, by using the trunk line as a common circuit element and associating the kind and number of branch lines combined therewith with the difference in vehicle type, the presence or absence of optional electric components and the like, increase in vehicle kind and article number can be minimized. Moreover, if the second circuit is limited only to a common circuit element not dependent on the vehicle type, branching and the like at the second circuit can be minimized, which contributes to structure simplification, size reduction, weight reduction and the like.

According to the circuit for a vehicle of the structure of the above (2), by using the communication between the higher level control portions and the lower level control portions, distribution of the power supplied from the trunk line to the branch lines can be controlled appropriately. Therefore, even when various accessories (electric components) of different kinds are connected to the trunk line through the branch lines, it is unnecessary to form a circuit specifically designed for each accessory. For this reason, the trunk line with a simplified structure can be used as a common constituent not dependent on the vehicle type or the like.

According to the circuit for a vehicle of the structure of the above (3), since a plurality of branch lines can be connected to each of the branch portions, increase in the total number of branch portions is suppressed, which facilitates structure simplification. Moreover, by the workings of the switching circuit, the connection position can be easily changed.

According to the circuit for a vehicle of the structure of the above (4), by switching the selection condition of the selecting switch device, one common terminal of the trunk line can be connected to any of the power supply terminal, the ground terminal and the communication terminal. Moreover, by the workings of the control device, the connection condition of the communication terminal can be controlled appropriately. Therefore, even when the position of the terminal connecting the trunk line and the branch lines is shifted, the circuit can be switched so that the kinds of the connected terminals match with each other. For this reason, the degree of freedom of the connection increases, and the terminal shape and the like can be commonalized.

According to the circuit for a vehicle of the structure of the above (5), by controlling the switching elements, the power supplied to the accessory from the trunk line by way of the accessory can be controlled appropriately. For example, when a plurality of terminals of the trunk line are connected to the branch lines by way of the switching elements, by increasing or decreasing the number of switching elements that are ON, the supplied power can be increased or decreased.

According to the circuit for a vehicle of the structure of the above (6), since the circuit is structured so as to be divided into a standard circuit used commonly to a plurality of vehicle types, grades or options and an optional circuit changed according to a plurality of vehicle types, grades or options, even if the number of vehicle types, grades or options is increased, only the portion where the wiring differs according to a plurality of vehicle types, grades or options is necessarily prepared as an optional circuit, so that facilitation of manufacture and reduction in cost can be achieved.

According to the circuit for a vehicle of the present invention, the structure for electric connection between various electric components and the power source on the vehicle and between electric components can be simplified, manufacture can be facilitated, and size reduction and weight reduction become possible.

DETAILED DESCRIPTION OF EMBODIMENTS

A concrete embodiment related to the present invention will be described below with reference to the drawings.

First, the basic structure of the circuit for a vehicle will be described.

Figure 1A:
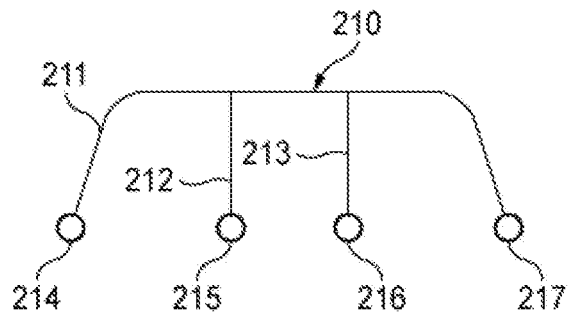
FIG. 1A, FIG. 1B, FIG. 1C and FIG. 1D are plan views showing the general outlines of the appearance related to a structure example of main constituents or an aggregate thereof of a circuit for a vehicle in an embodiment of the present invention.
Figure 1B:
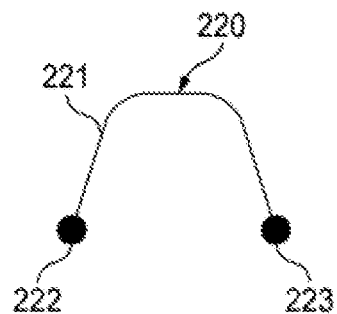
Figure 1C:
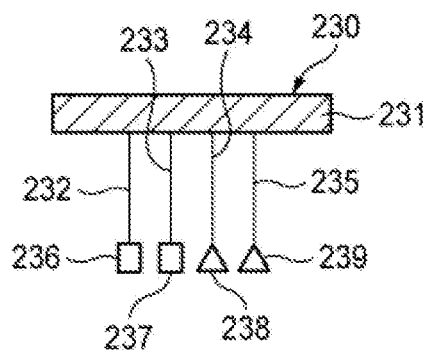
Figure 1D:
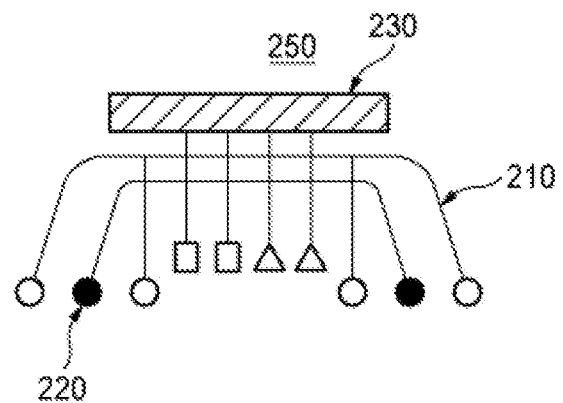
Figure 2:
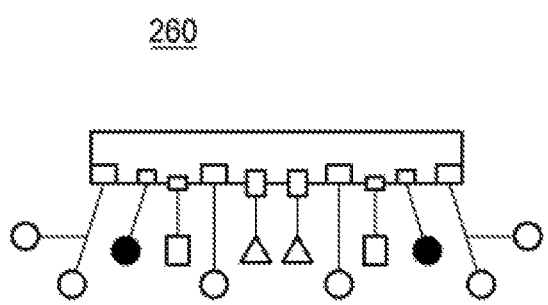
FIG. 2 is a plan view showing the general outline of the appearance of a wire harness structured by using a general method.

The general outlines of the appearances of main constituents of the circuit for a vehicle in the embodiment of the present invention are shown in FIG. 1A, FIG. 1B and FIG. 1C. Moreover, the appearance of a circuit for a vehicle structured as an aggregate of these constituents is shown in FIG. 1D. Moreover, to facilitate the understanding of the difference between the circuit for a vehicle shown in FIG. 1D and a general structure, an example of the appearance of a wire harness structured by using a general method is shown in FIG. 2.

While the circuit for a vehicle of the present invention realizes a function corresponding to a part or the whole of a general wire harness mounted on a vehicle, the shape and the structure largely differ from those of the general wire harness. Specifically, to simplify the structure, backbone structures having a simple shape are used for routing. And branch lines are connected to the trunk lines of the backbone structures so that various accessories (electric components) can be connected through the branch lines.

In the present embodiment, for example, a first base circuit 210 shown in FIG. 1A, a second base circuit 220 shown in FIG. 1B and an additional part circuit 230 shown in FIG. 1C are individually manufactured as main parts in a state of being independent of one another, and thereafter, as an aggregate where these are combined, a circuit 250 for a vehicle shown in FIG. 1D is manufactured.

The first base circuit 210 shown in FIG. 1A is a part for realizing the basic circuit connection (particularly, the wiring of the power source) of the electric components commonly mounted on all the vehicles irrespective of the difference in vehicle type and the presence or absence of an optional electric component, and the structure is common to all the vehicles. Moreover, the second base circuit 220 shown in FIG. 1B is, for example, a part for realizing the basic circuit connection (particularly, the wiring of the power source) common to all the vehicles designed for cold districts, and this structure is also common to all the vehicles designed for cold districts.

On the other hand, the additional part circuit 230 shown in FIG. 1C is a part for realizing a circuit connection (power source, communication and other wirings) the structure of which can be changed according to the difference in the type of the vehicle mounted therewith and the presence or absence and kind of various optional electric components.

By combining the first base circuit (standard circuit) 210 shown in FIG. 1A, the second base circuit 220 (semistandard circuit) shown in FIG. 1B and the additional part circuit (optional circuit) 230 shown in FIG. 1C, the circuit 250 for a vehicle shown in FIG. 1D is manufactured. In the case of vehicles not designed for cold districts, the second base circuit 220 is excluded from the structure of the circuit 250 for a vehicle. Moreover, the structure of the additional part circuit 230 included in the circuit 250 for a vehicle is changed according to the difference in the type of the vehicle mounted therewith and the presence or absence and kind of various optional electric components.

On the other hand, a circuit 260 for a vehicle shown in FIG. 2 is structured as an aggregate of a multiplicity of electric wires so that the circuit connections similar to those of the circuit 250 for a vehicle shown in FIG. 1D can be realized. However, as is apparent from the comparison between FIG. 1D and FIG. 2, the structure of the circuit 250 for a vehicle is very simple compared with that of the circuit 260 for a vehicle. That is, although the circuit 260 for a vehicle has a multiplicity of branch points, the circuit 250 for a vehicle has a small number of branch points and this facilitates manufacture. Moreover, in the case of the circuit 260 for a vehicle, since the overall structure is changed according to the difference in the type of the vehicle mounted therewith and the presence or absence and kind of various optional electric components, the numbers of kinds and article numbers of the products and the parts are increased. On the contrary, for the circuit 250 for a vehicle, only the structure of the additional part circuit 230 is changed. Moreover, since the additional part circuit 230 is simple in structure and common parts can be used as described below, manufacturing cost can be reduced.

The first base circuit 210 shown in FIG. 1A has electric wires 211, 212 and 213 and terminal portions 214, 215, 216 and 217. The terminal portions 214, 215, 216 and 217 are connected to predetermined electric components on the vehicle, respectively. Moreover, the second base circuit 220 shown in FIG. 1B has an electric wire 221 and terminal portions 222 and 223. The terminal portions 222 and 223 are connected to predetermined electric components on the vehicle, respectively.

On the other hand, the additional part circuit 230 shown in FIG. 1C is formed of a backbone structure 231 and branch lines 232, 233, 234 and 235 connected to portions thereof. Terminal portions (connectors and the like) 236, 237, 238 and 239 for connection to electric components are provided at the end portions of the branch lines 232, 233, 234 and 235, respectively. The backbone structure 231 is provided with a trunk line to which various branch lines are connectable, and the branch lines are connected to desired positions on this trunk line as required.

The number and kind of branch lines connected to the backbone structure 231 are changed according to the change of the type of the vehicle mounted with the circuit 250 for a vehicle, the presence or absence of various optional electric components and the difference in kind. The backbone structure 231 is used for all the vehicles as a common part. The branch lines 232, 233, 234 and 235 are structured so as to be detachably attachable to the backbone structure 231 by a connector or the like.

Therefore, only by combining various kinds of branch lines with the backbone structure 231, a circuit 250 for a vehicle compatible with various types of vehicles and various optional electric components can be easily manufactured. Since the first base circuit 210, the second base circuit 220 and the backbone structure 231 are commonly used for all the vehicles, many of the parts constituting the circuit 250 for a vehicle can be commonalized, so that the numbers of kinds and article numbers of the parts can be reduced.

Next, a structure example of the additional part circuit 230 constituting the circuit for a vehicle will be described.

Figure 3:
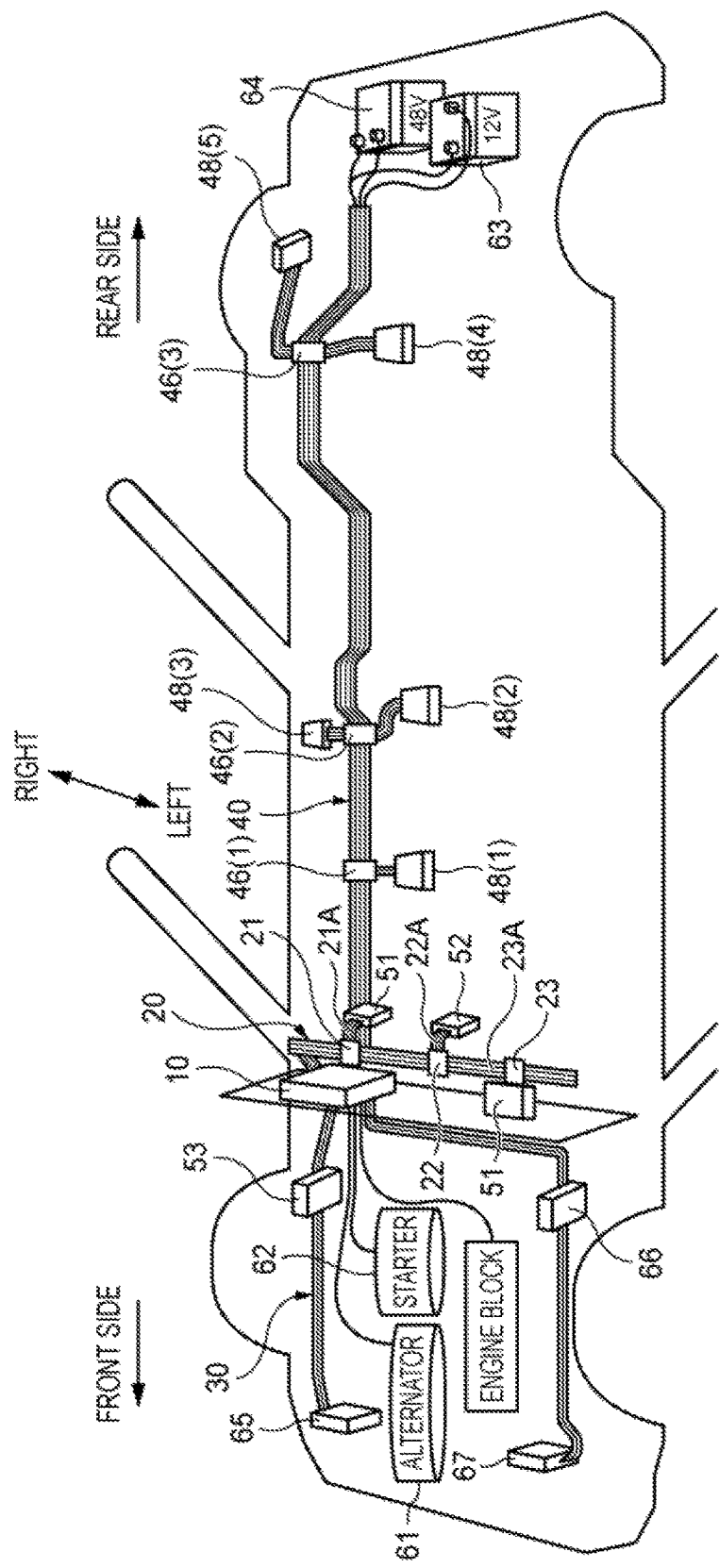
FIG. 3 is a perspective view showing the general outline of the layout of each portion and the connection condition under a condition where an additional part circuit shown in FIG. 1C is routed on the vehicle body.

The general outline of the layout of each portion and the connection condition under a condition where the additional part circuit 230 shown in FIG. 1C is routed on the vehicle body is shown in FIG. 3. Moreover, a structure example of the principal portion of a system including the additional part circuit 230 shown in FIG. 3 is shown in FIG. 4.

Figure 4:
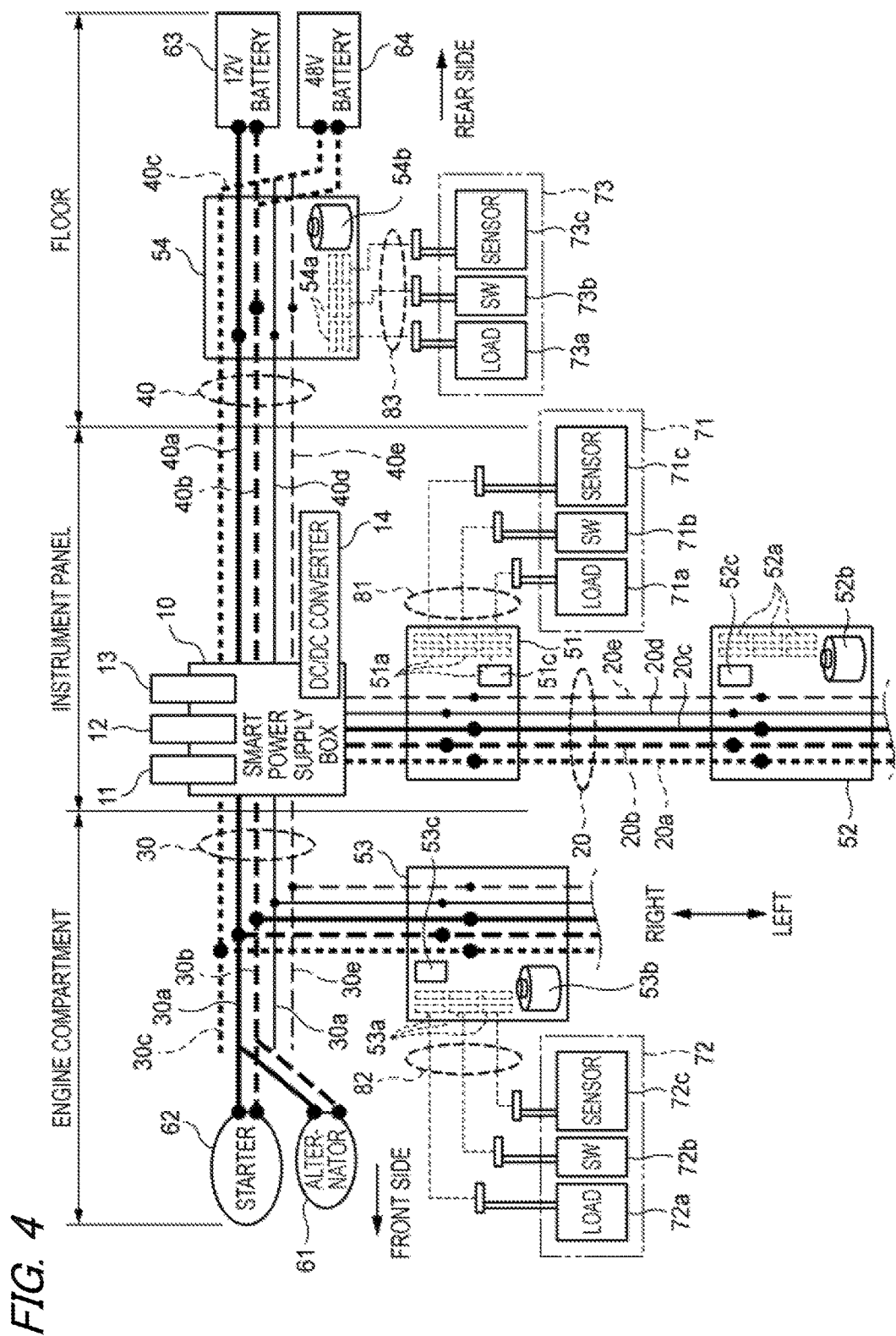
FIG. 4 is a block diagram showing a structure example of a principal portion of a system including the additional part circuit shown in FIG. 3.

The system including the circuit for a vehicle shown in FIG. 3 and FIG. 4 is provided with, as basic constituents, a smart power supply box 10, a first backbone structure 20 for instrument panel portion routing, a second backbone structure 30 for engine compartment portion routing, and a third backbone structure 40 for floor portion routing.

Next, the first backbone structure 20 for instrument panel portion routing will be described.

The first backbone structure 20 is a structure routed in the right-left direction along the instrumental panel of the vehicle, and is provided with a plurality of routing conductive members 20a, 20b, 20c, 20d and 20e as shown in FIG. 4. These routing conductive members 20a, 20b, 20c, 20d and 20e are parts such as bus bars formed of, for example, electric wires or a metallic material excellent in conductivity, and these are integrated as a structure.

In the example shown in FIG. 4, the routing conductive member 20a is a power supply line for passing a DC source power of +5 [V], the routing conductive member 20b is a power supply line for passing a DC source power of +12 [V], the routing conductive member 20c is a ground line for connection to the ground (that is, the earth), and the routing conductive members 20d and 20e are signal lines used for transmitting digital signals for communication and various analog signals. The ground line of each backbone structure may be omitted. For example, when the vehicle body is a metal, the vehicle body earth can be used by connecting the vehicle body to a vehicle body in the neighborhood.

Next, the second backbone structure 30 for engine compartment portion routing will be described.

The second backbone structure 30 is a structure routed in the engine compartment of the vehicle, that is, the engine room, and is provided with a plurality of routing conductive members 30a, 30b, 30c, 30d and 30e. These routing conductive members 30a, 30b, 30c, 30d and 30e are parts such as bus bars formed of, for example, electric wires or a metallic material excellent in conductivity, and these are integrated as a structure.

In actuality, since it is necessary to pass large current through the electric wires and the ground line, the routing conductive members 30a, 30b and 30c are formed of bus bars sufficiently large in cross-sectional area. Moreover, by using flat plate-like bus bars, bending in the direction of the thickness is facilitated, so that processing to a shape conforming to a predetermined routing path is facilitated. Moreover, by forming the two communication lines of a twisted pair line where two electric wires are twisted, the influence of external noise can be reduced.

In the example shown in FIG. 4, the routing conductive member 30a is a power supply line for passing a DC source power of +12 [V], the routing conductive member 30b is a ground line for connection to the ground, the routing conductive member 30c is a power supply line for passing a DC source power of +48 [V], and the routing conductive members 30d and 30e are communication lines. The routing conductive members 30a and 30b of the second backbone structure 30 have the end portions thereof connected to an alternator (generator) 61 and a starter 62 as shown in FIG. 4.

Next, the third backbone structure 40 for floor portion routing will be described.

The third backbone structure 40 is a structure routed to the rear side in the front-rear direction as shown in FIG. 3 along the floor portion in the cabin of the vehicle, and is provided with a plurality of routing conductive members 40a, 40b, 40c, 40d and 40e. These routing conductive members 40a, 40b, 40c, 40d and 40e are parts such as bus bars formed of, for example, electric wires or a metallic material excellent in conductivity, and these are integrated as a structure.

In actuality, since it is necessary to pass large current through the power supply lines and the ground line, the routing conductive members 40a, 40b and 40c are formed of bus bars sufficiently large in cross-sectional area. Moreover, by using flat plate-like bus bars, bending in the direction of the thickness is facilitated, so that processing to a shape conforming to a predetermined routing path is facilitated. Moreover, by forming the two communication lines of a twisted pair line where two electric wires are twisted, the influence of external noise can be reduced.

In the example shown in FIG. 4, the routing conductive member 40a is a power supply line for passing a DC source power of +12 [V], the routing conductive member 40b is a ground line for connection to the ground, the routing conductive member 40c is a power supply line for passing a DC source power of +48 [V], and the routing conductive members 40d and 40e are communication lines.

The routing conductive member 40a of the third backbone structure 40 has the end portion thereof connected to the positive electrode of a first battery 63, the end portion of the routing conductive member 40b is connected to the negative electrodes of the first battery 63 and a second battery 64, and the end portion of the routing conductive member 40c is connected to the positive electrode of the second battery 64.

The first battery 63 and the second battery 64 are disposed in positions such as below the trunk of the vehicle rear portion. The first battery 63 is a storage battery capable of charging and discharging a DC power of +12 [V], and the second battery 64 is a storage battery capable of charging and discharging a DC power of +48 [V].

Next, the smart power supply box 10 will be described.

As shown in FIG. 3 and FIG. 4, the smart power supply box 10 is connected to the first backbone structure 20, the second backbone structure 30 and the third backbone structure 40, and is capable of controlling the entire system.

The routing conductive members 30a, 30b, 30c, 30d and 30e of the second backbone structure 30 are connected inside the smart power supply box 10 so as to be connected to the routing conductive members 40a, 40b, 40c, 40d and 40e of the third backbone structure 40, respectively.

Moreover, a DC/DC converter 14 provided inside the smart power supply box 10 is capable of generating DC powers of +5 [V] and +12 [V] based on the power of +12 [V] supplied through the routing conductive member 40a or the power of +48 [V] supplied through the routing conductive member 40c, and supplying them to the first backbone structure 20.

The smart power supply box 10 is provided with a plurality of electronic control units (ECUs) 11, 12 and 13 detachably attachable on an individual basis. For example, by replacing the electronic control unit attached to the smart power supply box 10 for each vehicle type, additions and changes of functions can be made.

By the workings of these electronic control units, the smart power supply box 10 can execute various controls. For example, the smart power supply box 10 automatically recognizes what are connected to the positions under the command of the first backbone structure 20, the second backbone structure 30 and the third backbone structure 40, and executes appropriate controls. These controls include circuit switching conforming to the difference in connection position, supplied power switching, excess current control, power backup control when an abnormal condition occurs, and communication gateway control. Moreover, a near field communication function for wireless communication among devices on the vehicle is also provided in the smart power supply box 10.

Next, area drivers and accessories will be described.

In the system shown in FIG. 4, area drivers 51, 52 and the like are connected to the first backbone structure 20 so that various accessories (electric components) can be easily connected under the command of the first backbone structure 20. Moreover, to the second backbone structure 30, an area driver 53 is connected, and to the third backbone structure 40, an area driver 54 is connected.

For example, the area driver 51 is provided with a downstream side connection portion 51a and a slave control portion 51c. The downstream side connection portion 51a is formed as a plurality of connectors of, for example, the USB (universal serial bus) standard, and is provided with a serial communication function and a power supply function.

In the example shown in FIG. 1, an accessory 71 including a load 71a, a switch 71b and a sensor 71c is connected to the downstream side connection portion 51a of the area driver 51 through a sub harness 81. The sub harness 81 may be prepared individually for each of the load 71a, the switch 71b and the sensor 71c, or it is considered to put these together into a whole.

The slave control portion 51*c* has the function of receiving an instruction from a higher level electronic control unit (ECU) by way of the smart power supply box 10 and the first backbone structure 20, controlling the load 71*a* according to the received contents and transmitting information indicative of the condition of the switch 71*b* and information indicative of the detection condition of the sensor 71*c* to the higher level electronic control unit. Moreover, the slave control portion 51*c* also has the function of transmitting information on the source power required by the accessory 71 to the smart power supply box 10.

In the example shown in FIG. 4, the area driver 52 incorporates a backup battery 52*b*. This backup battery 52*b* is provided in order that when a trouble of some kind occurs on any power supply path in the system and a position where power supply is stopped occurs, source power for backup is supplied to the pertinent position. A slave control portion 52*c* in the area driver 52 is provided with a near field communication function. When detecting the occurrence of an abnormal condition based on the information from an electronic control unit in the smart power supply box 10 by near field communication, the slave control portion 52*c* outputs the source power of the backup battery 52*b* to the power supply route of the first backbone structure 20.

Therefore, in cases such as when a disconnection occurs on the first backbone structure 20 so that power supply to the area driver 51 is stopped, the power of the backup battery 52*b* can be supplied to the accessory 71 under the command of the area driver 51. Since near field communication is used in this case, backup power can be supplied even when the communication line is shut off on the first backbone structure 20.

By incorporating the backup battery 52*b* on the area driver 52, reliability when an abnormal condition occurs can be ensured without a backup power source being individually provided to each accessory. By placing the backup power source on the side of the area driver 52, the total number of backup power sources can be reduced as a whole system, which is helpful to size reduction and weight reduction.

In the example shown in FIG. 4, a backup battery 53*b* is also provided inside the area driver 53 connected to the second backbone structure 30, and a backup battery 54*b* is provided inside the area driver 54 connected to the third backbone structure 40. Therefore, it is possible to select any of the backup batteries 52*b*, 53*b* and 54*b* according to the position where a disconnection or the like occurs or combine these to supply appropriate backup power to a required position on the system.

In the example shown in FIG. 4, an accessory 72 including a load 72*a*, a switch 72*b* and a sensor 72*c* is connected to a downstream side connection portion 53*a* of the area driver 53 through a sub harness 82. A slave control portion 53*c* in the area driver 53 has the function of receiving an instruction from a higher level electronic control unit (ECU) by way of the smart power supply box 10 and the second backbone structure 30, controlling the load 72*a* according to the received contents and transmitting information indicative of the condition of the switch 72*b* and information indicative of the detection condition of the sensor 72*c* to the higher level electronic control unit. Moreover, the slave control portion 53*c* also has the function of transmitting information on the source power required by the accessory 72 to the smart power supply box 10.

Similarly to the above, an accessory 73 including a load 73*a*, a switch 73*b* and a sensor 73*c* is connected to a downstream side connection portion 54*a* of the area driver 54 through a sub harness 83. A slave control portion in the area driver 54 has the function of receiving an instruction from a higher level electronic control unit (ECU) by way of the smart power supply box 10 and the third backbone structure 40, controlling the load 73*a* according to the received contents and transmitting information indicative of the condition of the switch 73*b* and information indicative of the detection condition of the sensor 73*c* to the higher level electronic control unit. Moreover, this slave control portion also has the function of transmitting information on the source power required by the accessory 73 to the smart power supply box 10.

Next, an example of the concrete layout and the connection condition will be described.

Figure 5:
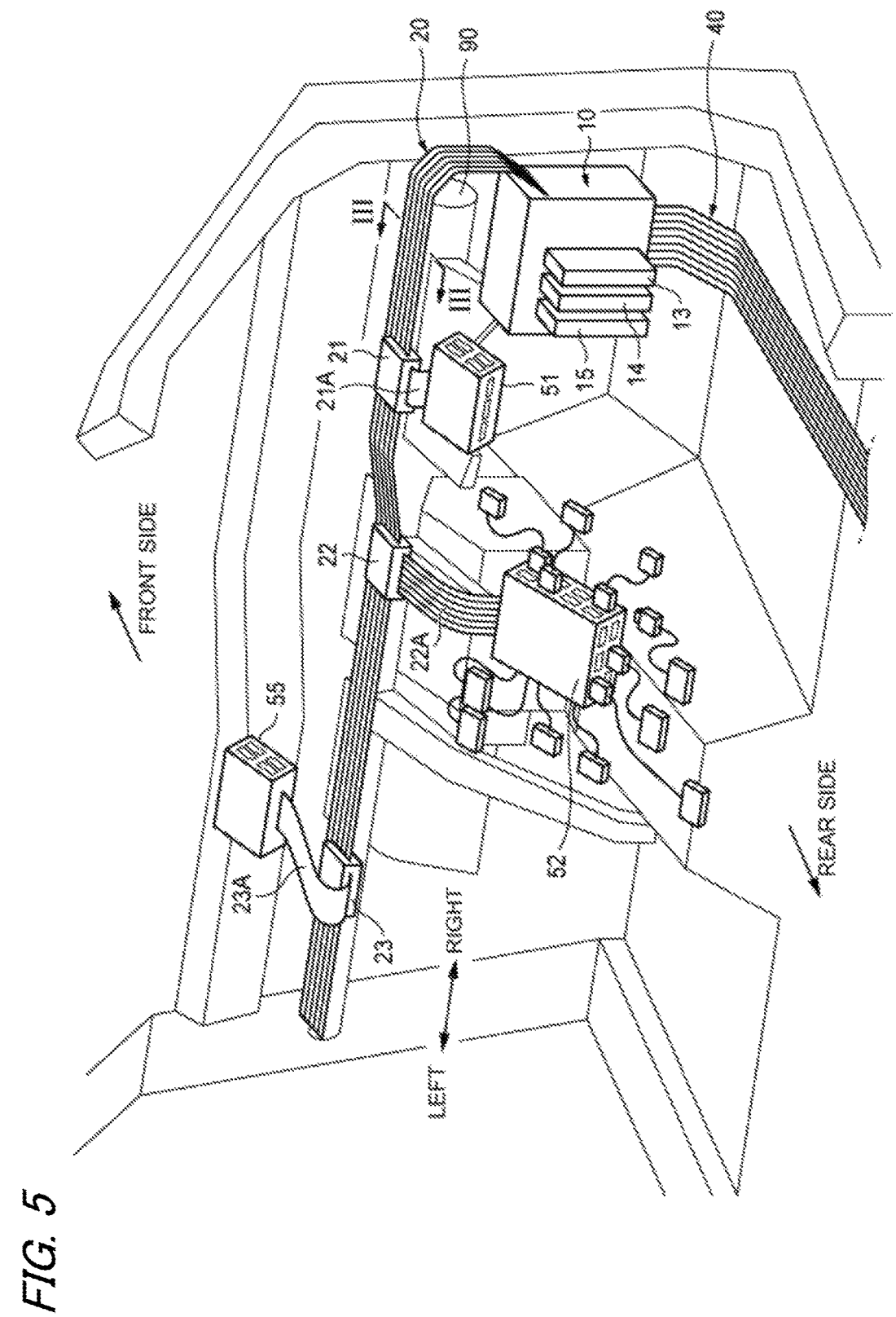
FIG. 5 is a perspective view showing the concrete layout and the connection condition in the cabin related to one portion of the system shown in FIG. 4.

The concrete layout and the connection condition in the cabin related to one portion of the system shown in FIG. 4 are shown in FIG. 5. Moreover, a structure example of the cross section viewed from the III-III line in FIG. 5 is shown in FIG. 6A, and a modification of the same portion of FIG. 6A is shown in FIG. 6B.

In the vehicle shown in FIG. 5, a reinforcement 90 which is a portion of the vehicle body framework is disposed in the right-left direction in a position below the instrument panel (not shown) in front of the driver seat. The first backbone structure 20 shown in FIG. 4 is placed along this reinforcement 90 or so as to be a structure integral therewith.

Figure 6A:
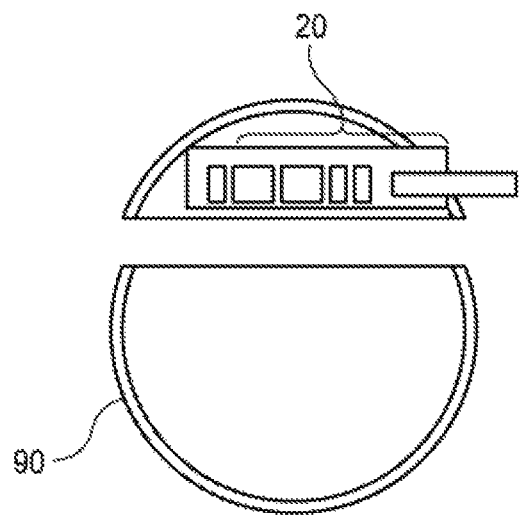
FIG. 6A is a cross-sectional view showing a structure example of the cross section viewed from the III-III line in FIG. 5.
Figure 6B:
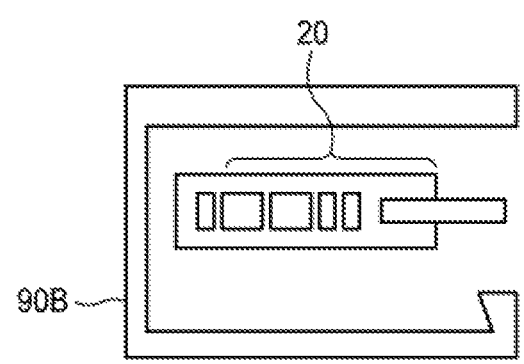
FIG. 6B is a cross-sectional view showing a modification of the same portion of FIG. 6A.

For example, in the structure example shown in FIG. 6A, a portion on the upper side of the reinforcement 90 having a circular cross section is processed to form a plane surface, and the first backbone structure 20 having a sheet-form cross section is fixed along this plane surface. In the structure example shown in FIG. 6B, a reinforcement 90B is formed to have a hollow structure, and in the space inside the reinforcement 90B, the first backbone structure 20 having a sheet-form cross section is accommodated so as to be integrated.

The smart power supply box 10 included in the system shown in FIG. 4 is placed on the right side in front of the driver seat in the example shown in FIG. 5. The right end of the first backbone structure 20 is connected to the smart power supply box 10. Moreover, an end of the third backbone structure 40 is connected to the lower end of the smart power supply box 10.

As shown in FIG. 5, the first backbone structure 20 and the third backbone structure 40 are both sheet-formed, and have a simple shape. Moreover, these are partially bent according to the shapes of the portions where they are placed. Since they are sheet-formed, bending in the direction of the thickness is comparatively easy.

In the structure shown in FIG. 5, branch and connection boxes 21, 22 and 23 are placed in the intermediate portion on the first backbone structure 20. The first area driver 51 is connected to the first backbone structure 20 through the branch and connection box 21, the second area driver 52 is connected to the first backbone structure 20 through the branch and connection box 22, and a third area driver 55 is connected to the first backbone structure 20 through the branch and connection box 23.

The branch and connection boxes 21, 22 and 23 have branch lines 21A, 22A and 23A for branching the routing conductive members 20*a*, 20*b*, 20*c*, 20*d* and 20*e* on the first backbone structure 20 to connect them to the area drivers 51, 52 and 55.

In the structure shown in FIG. 5, for example, since a multiplicity of sub harnesses 81 are connected to a downstream side connection portion 52*a* of the area driver 52, various kinds of accessories can be connected to the sub harnesses 81. Accessories may be connected to the connectors of the downstream side connection portion 52a without the use of the sub harnesses 81.

Regarding the routing conductive members 20a to 20e in the first backbone structure 20, they may be disposed so as to be arranged in the direction of the width of the backbone structure as shown in FIG. 6A or may be laminated in the direction of the thickness. However, it is necessary to sandwich an electrically insulating material such as resin therebetween or cover the outside in order that the routing conductive members 20a to 20e are electrically insulated from one another. The same applies to the second backbone structure 30 and the third backbone structure 40.

The area drivers 51, 52 and 55 are each provided with wired and wireless communication modules, a connection port of the USB standard, and semiconductors (or a complex thereof) provided with functions of a switch, a fuse and the like. Moreover, at least one of the area drivers 51, 52 and 55 is mounted with the backup battery 52b shown in FIG. 4.

Moreover, as shown in FIG. 3, on the third backbone structure 40, branch and connection boxes 46(1), 46(2) and 46(3) are placed in different positions, respectively. To the first branch and connection box 46(1), an area driver 48(1) is connected, to the second branch and connection box 46(2), two area drivers 48(2) and 48(3) are connected in parallel, and to the third branch and connection box 46(3), two area drivers 48(4) and 48(5) are connected in parallel. Therefore, various accessories can be connected to the third backbone structure 40 through any of the area drivers 48(1) to 48(5) in the neighborhood of the floor.

Moreover, as shown in FIG. 3, on the second backbone structure 30, area drivers 53, 65, 66 and 67 are connected. Therefore, the accessories in the engine room can be connected to the second backbone structure 30 through any of the area drivers 53, 65, 66 and 67.

Next, details of the condition of connection between the backbone structures and accessories will be described.

Figure 7:
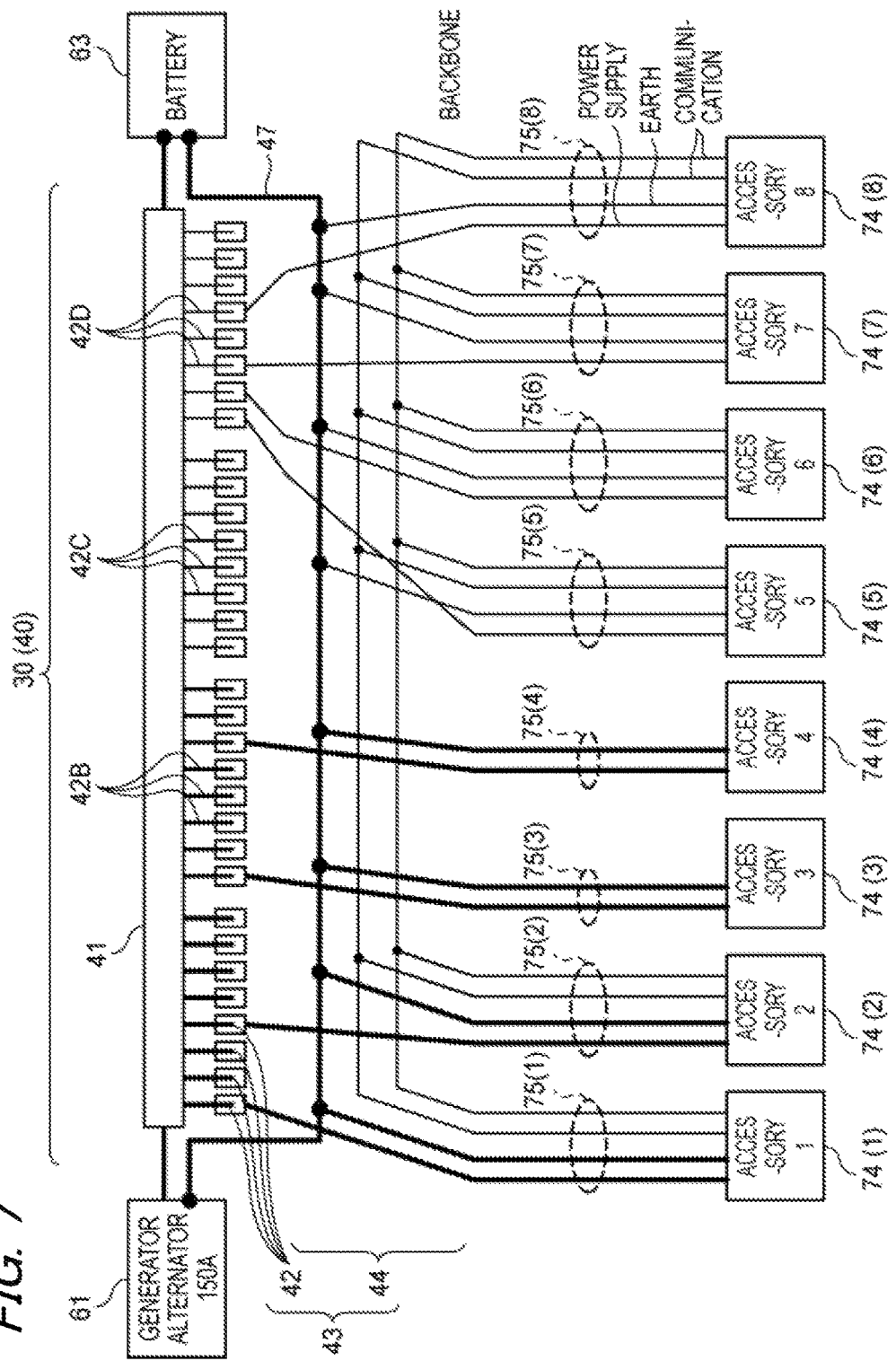
FIG. 7 is a block diagram showing a structure example for interconnecting backbone structures and a plurality of accessories.
Figure 8A:
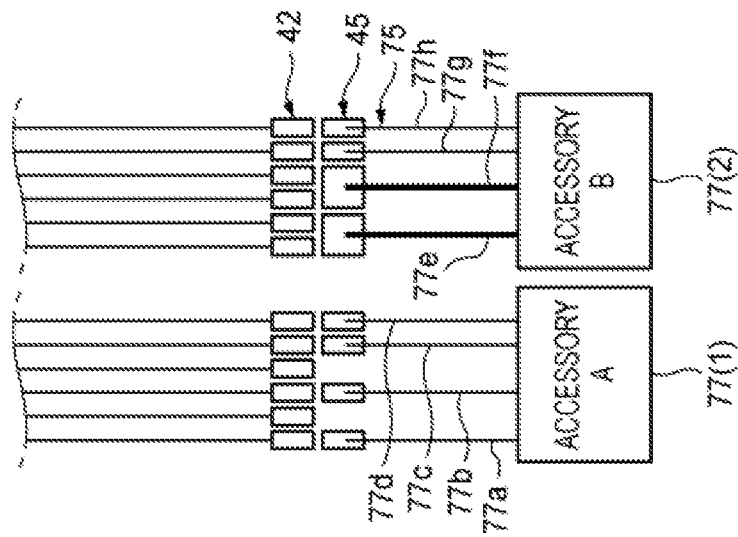
FIG. 8A and FIG. 8B are block diagrams showing more concrete connection examples of the structure shown in FIG. 7.
Figure 8B:
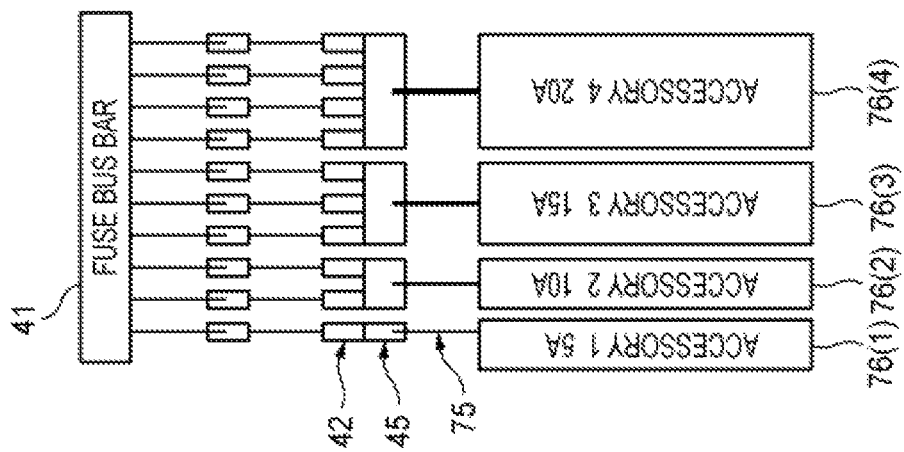

A structure example for interconnecting the backbone structures and a plurality of accessories is shown in FIG. 7. More concrete connection examples of the structure shown in FIG. 7 are shown in FIG. 8A and FIG. 8B.

In the system of the structure as shown in FIG. 4, various kinds of a multiplicity of accessories 74(1) to 74(8) are connected as shown in FIG. 7 to portions such as the second backbone structure 30 and the third backbone structure 40. In FIG. 7, the description of the area drivers is omitted for ease of understanding.

In the structure like FIG. 7, on the power supply side, the circuit is connected through a fuse in order that current of the circuit corresponding to a case where excess current flows can be shut off. Here, since the accessories 74(1) to 74(8) are different in the power supply current that they consume, appropriate shut-off control cannot be performed unless a fuse of an appropriate current value is individually prepared for each connected accessory. However, when a fuse of a different kind is used for each connected accessory, since the structure and specifications are different among the positions of connection, the complication of the structure cannot be avoided, and it cannot be helped that the positions of connection are limited in advance.

Next, a structure in a case where a plurality of kinds of fuses are prepared will be described.

In the structure shown in FIG. 7, a multiplicity of terminals 42 are disposed so as to be arranged at regular intervals on a fuse bus bar 41 provided on the power supply line (the routing conductive member 40a) of the second backbone structure 30 or the third backbone structure 40. The difference in display thickness of the terminals 42 in FIG. 7 indicates the difference in fuse capacity. That is, the terminals 42 shown as thick lines are high in the value of the current being shut off, and the terminals 42B, 42C and 42D shown as thin lines are low in the value of the current to be shut off.

In the structure shown in FIG. 7, since the accessories 74(1) and 74(2) are highest in consumed current, they are connected to the left side terminals 42 with the highest current value through wirings 75(1) and 75(2) and a connection portion 43, respectively. Moreover, since the accessories 74(3) and 74(4) are the second largest in consumed current, they are connected to the terminals 42B with the second highest current value through the wirings 75(3) and 75(4), respectively. Moreover, since the accessories 74(5) to 74(8) are the smallest in consumed current, they are connected to the terminals 42D with the lowest current value through the wirings 75(5) to 75(8) and the connection portion 43, respectively.

Next, a structure in a case where a common fuse is used will be described.

In the structure shown in FIG. 8A and the structure shown in FIG. 8B, a multiplicity of terminals 42 connected to the fuse bus bar 41 are all connected through a fuse with a standardized constant current value (5 [A] in this example).

Moreover, in the structure shown in FIG. 8A, a case is assumed in which the values of the excess currents of the connected four accessories 76(1), 76(2), 76(3) and 76(4) are 5 [A], 10 [A], 15 [A] and 20 [A], respectively.

In this case, since the first accessory 76(1) is only necessarily shut off by the power supply current of 5 [A], as shown in FIG. 8A, the power supply line of the accessory 76(1) is connected to only one of the multiplicity of terminals 42 through the wiring 75.

On the other hand, since the second accessory 76(2) is necessarily shut off by the power supply current of 10 [A], the use of only one terminal 42 makes current insufficient. Therefore, as shown in FIG. 8A, the terminal 45 at the end of the wiring 75 connected to the power supply line of the accessory 76(2) is commonly connected to adjoining two terminals of the multiplicity of terminals 42. Because of this connection, the fuse is never shut off until a current of 10 [A] flows through the power supply line of the accessory 76(2).

Moreover, since the third accessory 76(3) is necessarily shut off by the power supply current of 15 [A], as shown in FIG. 8A, the terminal 45 at the end of the wiring 75 connected to the power supply line of the accessory 76(3) is commonly connected to adjoining three terminals of the multiplicity of terminals 42. Because of this connection, the fuse is never shut off until a current of 15 [A] flows through the power supply line of the auxiliary 76(3).

Likewise, since the fourth accessory 76(4) is necessarily shut off by the power supply current of 20 [A], as shown in FIG. 8A, the terminal 45 at the end of the wiring 75 connected to the power supply line of the accessory 76(4) is commonly connected to adjoining four terminals of the multiplicity of terminals 42. Because of this connection, the fuse is never shut off until a current of 20 [A] flows through the power supply line of the auxiliary 76(4).

For example, the terminal 45 of the accessory 76(2) necessarily shut off by the power supply current of 10 [A] may be commonly connected to adjoining three or more terminals of the multiplicity of terminal 42. In that case, by shutting off the energization of terminals of a portion by using a switching circuit 44, the number of actually energized terminals is limited to two, and shutting off can be performed by the power supply current of 10 [A]. In this case, it is considered that an unenergized terminal is switched for use at the time of backup or the like when a failure occurs. The switching circuit 44 will be described after this.

On the other hand, in the structure shown in FIG. 8B, one accessory 77(1) has four independent power supply lines 77a, 77b, 77c and 77d, and the other accessory 77(2) has four independent power supply lines 77e, 77f, 77g and 77h. Moreover, the values of the excess currents of the power supply lines 77a, 77b, 77c, 77d, 77g and 77h are all 5 [A], and the values of the excess currents of the power supply lines 77e and 77f are both 10 [A].

Therefore, as shown in FIG. 8B, the power supply lines 77a, 77b, 77c and 77d of the accessory 77(1) are each connected to one terminal 42. Moreover, the power supply lines 77e and 77f of the accessory 77(2) are each commonly connected to two terminals 42, and the remaining power supply lines 77g and 77h are each connected to one terminal 42.

Next, a concrete example of the positional relationship between the terminals and connectors will be described.

Figure 9:
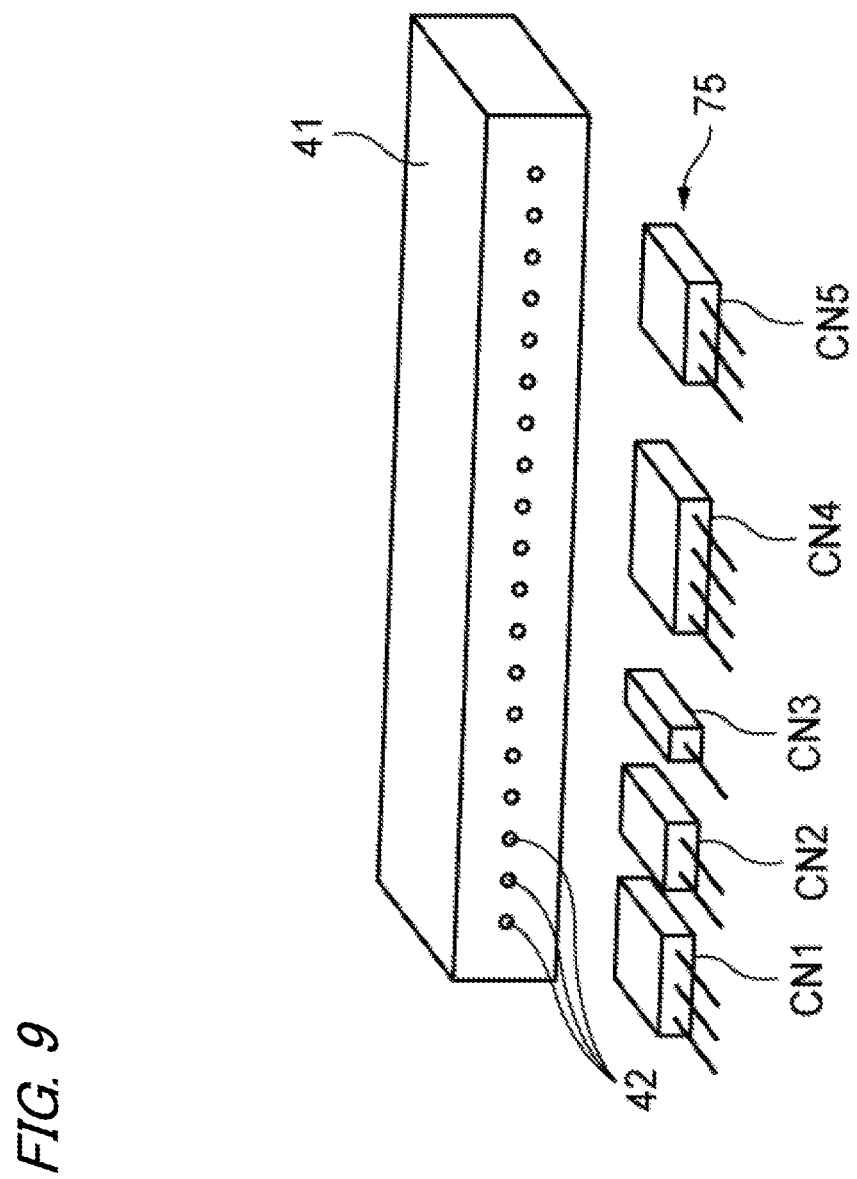
FIG. 9 is a perspective view showing an example of the arrangement condition of terminals of a fuse bus bar and the positional relationship with connectors of wirings connected thereto.

An example of the arrangement condition of the terminals of the fuse bus bar and the positional relationship with the connectors of the wirings connected thereto is shown in FIG. 9.

When connection is made as in FIG. 8A and FIG. 8B, the shape, dimensions, value of current to be shut off and other specifications of the multiplicity of terminals 42 can all be commonalized. Therefore, it is possible to standardize the structures of parts such as the fuse bus bar 41 and use common parts for various types of vehicles. Further, the positions of the terminals to be connected can be changed freely.

For example, the same operation can be performed irrespective of the position of the terminal 42 to which each of the terminals included in connectors CN1 to CN5 of the wirings 75 shown in FIG. 9 is connected, when the connectors CN1 to CN5 are each connected to the fuse bus bar 41, the connection position can be freely selected as required. For this reason, the kinds and article numbers of the parts can be reduced. Moreover, for example, when a new part is retrofitted, since the position of attachment can be freely selected, the attachment is easy.

Next, the switching circuit 44 will be described.

Figure 10:
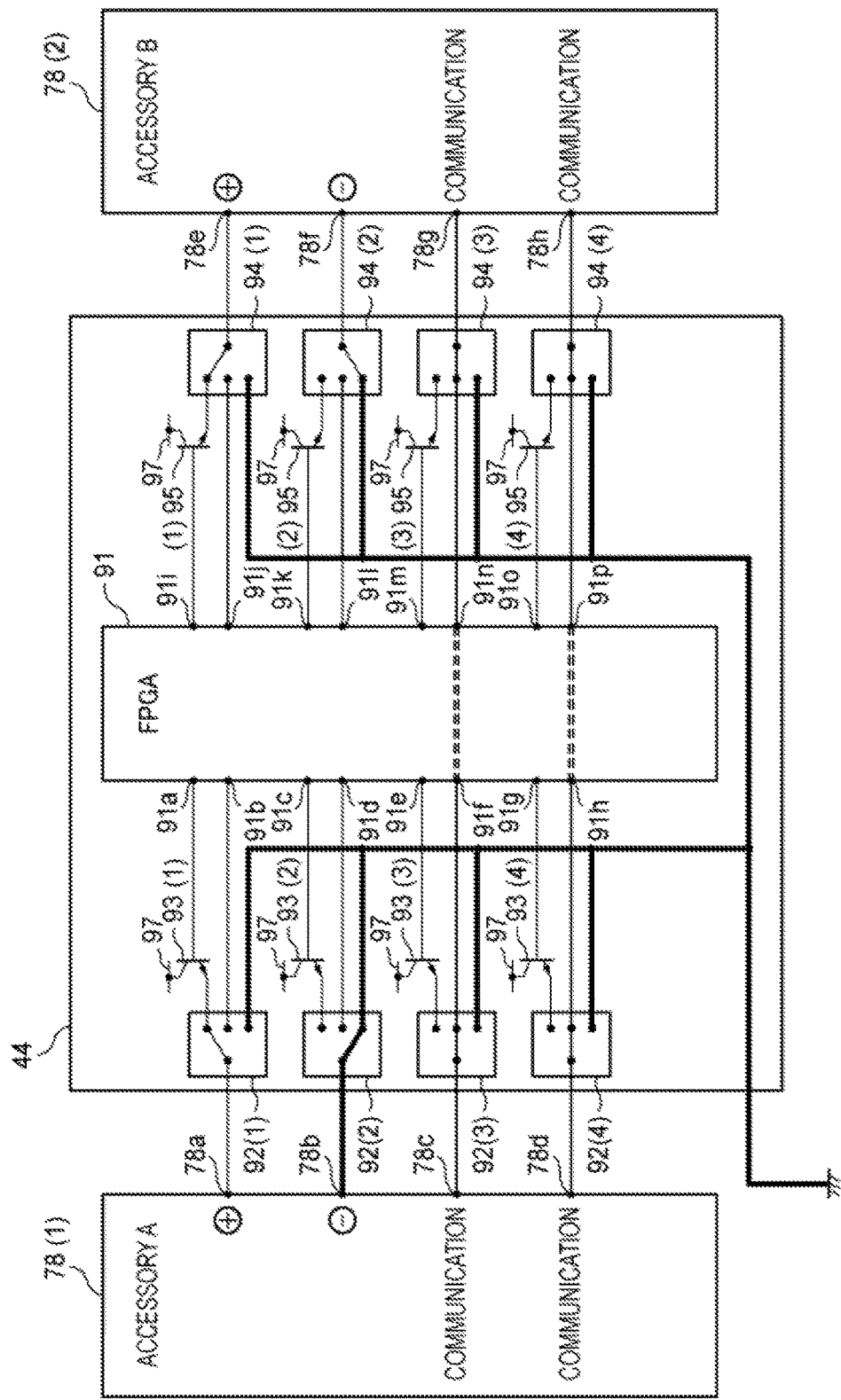
FIG. 10 is a block diagram showing a structure example of a switching circuit provided in the backbone structures.

A structure example of the switching circuit 44 provided in the backbone structures is shown in FIG. 10. This switching circuit 44 is provided in each of the first backbone structure 20, the second backbone structure 30 and the third backbone structure 40. And this switching circuit 44 has the function of switching the condition of connection, for example, between the terminals 42 of the fuse bus bar 41 shown in FIG. 7, a ground line 47 (corresponding to the routing conductive members 20c, 30b and 40b) and signal lines such as communication lines (corresponding to routing conductive members 40d, 40e and the like), and the wiring 75 of each accessory 74.

The switching circuit 44 shown in FIG. 10 is provided with an FPGA (field-programmable gate array) device 91, eight selecting switch devices 92(1), 92(2), 92(3), 92(4), 94(1), 94(2), 94(3) and 94(4) as constituents necessary for switching the connection condition of the two accessories 78(1) and 78(2). Further, to enable power supply control, eight transistors 93(1), 93(2), 93(3), 93(4), 95(1), 95(2), 95(3) and 95(4) for switching are provided.

In the example shown in FIG. 10, for ease of understanding, a case is assumed in which the accessory 78(1) has four terminals 78a to 78d and the accessory 78(2) has four terminals 78e to 78h. That is, the terminal 78a is a positive terminal for source power input, the terminal 78b is a negative terminal (ground) for source power input, and the terminals 78c and 78d are used for passing signals for communication. Moreover, the terminal 78e is a positive terminal for source power input, the terminal 78f is a negative terminal (ground) for source power input, and the terminals 78g and 78h are used for passing signals for communication.

However, since there is a possibility that the actual number of terminals of each accessory 78 increases or decreases as required, it is necessary to change the numbers of constituents inside the switching circuit 44 in conformity with the actual number of terminals. That is, an independent selecting switch device 92 and transistor 93 are connected to the terminal of each accessory 78.

Alternatively, when a plurality of terminals 42 of the fuse bus bar 41 are commonly (parallelly) connected to one terminal of the accessories 78 as in FIG. 8A and FIG. 8B, there are cases where independent transistors 93 and 95 are prepared for each terminal 42 in order that circuit switching can be individually made for each terminal 42.

The selecting switch devices 92(1) to 92(4) and 94(1) to 94(4) each have three switching terminals and one common terminal connected to any of these.

In the structure shown in FIG. 10, the four terminals 78a, 78b, 78c and 78d of the accessory 78(1) are connected to the common terminal of the first selecting switch device 92(1), the common terminal of the second selecting switch device 92(2), the common terminal of the third selecting switch device 92(3) and the common terminal of the fourth selecting switch device 92(4), respectively.

Moreover, the upper switching terminal of the first selecting switch device 92(1) is connected to the emitter terminal of the first transistor 93(1). Likewise, the upper switching terminal of the second selecting switch device 92(2), the upper switching terminal of the third selecting switch device 92(3) and the upper switching terminal of the fourth selecting switch device 92(4) are connected to the emitter terminal of the second transistor 93(2), the emitter terminal of the third transistor 93(3) and the emitter terminal of the fourth transistor 93(4), respectively.

Moreover, the central switching terminal of the first selecting switch device 92(1) is connected to an input-output port 91b of the FPGA device 91. Likewise, the central switching terminal of the second selecting switch device 92(2), the central switching terminal of the third selecting switch device 92(3) and the central switching terminal of the fourth selecting switch device 92(4) are connected to input-output ports 91d, 91f and 91h of the FPGA device 91, respectively.

Moreover, the lower switching terminal of the selecting switch device 92(1), the lower switching terminal of the selecting switch device 92(2), the lower switching terminal of the selecting switch device 92(3) and the lower switching terminal of the selecting switch device 92(4) are all commonly connected to the same ground line 98 and grounded.

The first transistor 93(1) has its collector terminal connected to a power supply line 97 and has its base terminal connected to an output port 91a of the FPGA device 91. The second transistor 93(2) has its collector terminal connected to the power supply line 97 and has its base terminal connected to an output port 91c of the FPGA device 91. The third transistor 93(3) has its collector terminal connected to the power supply line 97 and has its base terminal connected to an output port 91e of the FPGA device 91. The fourth transistor 93(4) has its collector terminal connected to the power supply line 97 and has its base terminal connected to an output port 91g of the FPGA device 91.

Moreover, the four terminals 78e, 78f, 78g and 78h of the accessory 78(2) are connected to the common terminal of the first selecting switch device 94(1), the common terminal of the second selecting switch device 94(2), the common terminal of the third selecting switch device 94(3) and the fourth selecting switch device 94(4), respectively.

Moreover, the upper switching terminal of the first selecting switch device 94(1) is connected to the emitter terminal of the first transistor 95(1). Likewise, the upper switching terminal of the second selecting switch device 94(2), the upper switching terminal of the third selecting switch device 94(3) and the upper switching terminal of the fourth selecting switch device 94(4) are connected to the emitter terminal of the second transistor 95(2), the emitter terminal of the third transistor 95(3) and the emitter terminal of the fourth transistor 95(4), respectively.

Moreover, the central switching terminal of the first selecting switch device 94(1) is connected to an input-output port 91j of the FPGA device 91. Likewise, the central switching terminal of the second selecting switch device 94(2), the central switching terminal of the third selecting switch device 94(3) and the central switching terminal of the fourth selecting switch device 94(4) are connected to input-output ports 91l, 91n and 91p of the FPGA device 91, respectively.

Moreover, the lower switching terminal of the selecting switch device 94(1), the lower switching terminal of the selecting switch device 94(2), the lower switching terminal of the selecting switch device 94(3) and the lower switching terminal of the selecting switch device 94(4) are all commonly connected to the same ground line 98 and grounded.

The first transistor 95(1) has its collector terminal connected to the power supply line 97 and has its base terminal connected to an output port 91i of the FPGA device 91. The second transistor 93(2) has its connector terminal connected to the power supply line 97 and has its base terminal connected to an output port 91k of the FPGA device 91. The third transistor 93(3) has its collector terminal connected to the power supply line 97 and has its base terminal connected to an output port 91m of the FPGA device 91. The fourth transistor 93(4) has its collector terminal connected to the power supply line 97 and has its base terminal connected to an output port 91o of the FPGA device 91.

Next, the operation of the switching circuit 44 will be described.

When the first selecting switch device 92(1) is selecting the upper switching terminal as shown in FIG. 10, the terminal 78a can be connected to the power supply line 97 through the selecting switch device 92(1) and the transistor 93(1). That is, source power can be supplied from the power supply line 97 to the terminal 78a. Moreover, since the transistor 93(1) turns on/off according to the signal level (H/L) of the output port 91a of the FPGA device 91, it is also possible that the FPGA device 91 switches the presence or absence of the supply of the source power.

Moreover, if the terminal 78a of the accessory 78(1) performs signal input and output, by making switching so that the first selecting switch device 92(1) selects the central switching terminal, the terminal 78a can be connected to the input-output port 91b of the FPGA device 91 by way of the selecting switch device 92(1).

Moreover, if the terminal 78a of the accessory 78(1) is a ground terminal, by making switching so that the first selecting switch device 92(1) selects the lower switching terminal, the terminal 78a can be connected to the ground line 98 by way of the selecting switch device 92(1) and grounded.

Moreover, when the second selecting switch device 92(2) is selecting the lower switching terminal as shown in FIG. 10, since the terminal 78b of the accessory 78(1) is connected to the ground line 98 by way of the selecting switch device 92(2), the terminal 78b can be grounded.

Moreover, if the terminal 78b of the accessory 78(1) is a source power input terminal, by making switching so that the second selecting switch device 92(2) selects the upper switching terminal, the terminal 78b can be connected to the power supply line 97 through the selecting switch device 92(2) and the transistor 93(2). That is, source power can be supplied from the power supply line 97 to the terminal 78b. Moreover, since the transistor 93(2) turns on/off according to the signal level (H/L) of the output port 91c of the FPGA device 91, it is also possible that the FPGA device 91 switches the presence or absence of the supply of the source power.

Moreover, if the terminal 78b of the accessory 78(1) performs signal input and output, by making switching so that the second selecting switch device 92(2) selects the central switching terminal, the terminal 78b can be connected to the input-output port 91d of the FPGA device 91 by way of the selecting switch device 92(2).

Moreover, when the third selecting switch device 92(3) is selecting the central switching terminal as shown in FIG. 10, since the terminal 78c of the accessory 78(1) is connected to the input-output port 91f of the FPGA device 91 by way of the selecting switch device 92(3), a path for signal transmission can be secured between the terminal 78c and the input-output portion 91f.

Moreover, if the terminal 78b of the accessory 78(1) is a source power input terminal, by making switching so that the third selecting switch device 92(3) selects the upper switching terminal, the terminal 78c can be connected to the power supply line 97 through the selecting switch device 92(3) and the transistor 93(3). That is, source power can be supplied from the power supply line 97 to the terminal 78c. Moreover, since the transistor 93(3) turns on/off according to the signal level (H/L) of the output port 91e of the FPGA device 91, it is also possible that the FPGA device 91 switches the presence or absence of the supply of the source power.

Moreover, if the terminal 78b of the accessory 78(1) is a ground terminal, by making switching so that the third selecting switch device 92(3) selects the lower switching terminal, the terminal 78c can be connected to the ground line 98 by way of the selecting switch device 92(3) and grounded.

Moreover, when the fourth selecting switch device 92(3) is selecting the central switching terminal as shown in FIG. 10, since the terminal 78d of the accessory 78(1) is connected to the input-output port 91h of the FPGA device 91 by way of the selecting switch device 92(4), a path for signal transmission can be secured between the terminal 78c and the input-output portion 91f.

Moreover, if the terminal 78d of the accessory 78(1) is a source power input terminal, by making switching so that the fourth selecting switch device 92(4) selects the upper switching terminal, the terminal 78d can be connected to the power supply line 97 through the selecting switch device 92(4) and the transistor 93(4). That is, source power can be supplied from the power supply line 97 to the terminal 78d. Moreover, since the transistor 93(4) turns on/off according to the signal level (H/L) of the output port 91g of the FPGA device 91, it is also possible that the FPGA device 91 switches the presence or absence of the supply of the source power.

Moreover, if the terminal 78d of the accessory 78(1) is a ground terminal, by making switching so that the fourth selecting switch device 92(3) selects the lower switching terminal, the terminal 78d can be connected to the ground line 98 by way of the selecting switch device 92(4) and grounded.

That is, whether the terminal 78a of the accessory 78(1) is a power supply terminal, a ground terminal or a communication terminal, by switching the selection condition of the selecting switch device 92(1), the structure of the circuit can be switched to the condition matching with the function of the terminal. Likewise, regarding each of the terminals 78b, 78c and 78d of the accessory 78(1), by switching the selection conditions of the selecting switch devices 92(2), 92(3) and 92(4), the structure of the circuit can be switched to the condition matching with the function of the terminal.

The operations of the selecting switch devices 94(1), 94(2), 94(3) and 94(4) that switch the connection conditions of the terminals 78e, 78f, 78g and 78h of the other accessory 78(2) are similar to those of the above-described selecting switch devices 92(1) to 92(4). That is, regarding the connection conditions of the terminals 78e, 78f, 78g and 78h of the accessory 78(2), the structure of the circuit can also be switched to the condition matching with the function of each terminal by switching the selection conditions of the selecting switch devices 94(1), 94(2), 94(3) and 94(4).

Since the internal structure of the FPGA device 91 is programmable and can be freely changed as required, a path necessary for communication can also be secured. For example, when the terminals 78c and 78d of the accessory 78(1) are communication terminals and the terminals 78g and 78h of the accessory 78(2) are communication terminals as shown in FIG. 10, by interconnecting the input-output port 91f and the input-output port 91m inside the FPGA device 91 and interconnecting the input-output port 91h and the input-output port 91p inside the FPGA device 91, the terminal 78c of the accessory 78(1) and the terminal 78g of the accessory 78(2) are interconnected and further, the terminal 78d of the accessory 78(1) and the terminal 78h of the accessory 78(2) are interconnected, so that a communication path between the two accessories 78(1) and 78(2) can be secured.

Regarding the control like this, for example, when the selecting switch devices 92(1) to 92(4) and 94(1) to 94(4) are formed of externally controllable switches like relays, it can be executed by rewriting the programs of the FPGA devices 91 of the switching circuits 44 on the first backbone structure 20, the second backbone structure 30 and the third backbone structure 40 according to instructions from the electronic control units 11 to 13 in the smart power supply box 10. Thereby, even when the positions of connection between the power supply input terminal, the ground terminal, the communication terminal and the like on the accessory side and the terminals of the first to third backbone structures 20, 30 and 40 are shifted, switching to appropriate connection conditions can be automatically made.

When the selecting switch devices 92(1) to 92(4) shown in FIG. 10 are used, although the transistors 93(1) to 93(4) are not indispensable, the transistors 93(1) to 93(4) can be effectively utilized for source power control and the like.

For example, the terminals 78a and 78b of the accessory 78(1) shown in FIG. 10 are common power supply input terminals, by making switching so that the selecting switch devices 92(1) and 92(2) each select the upper switching terminal and connecting the power supply line 97 of the transistor 93(1) and the power supply line 97 of the transistor 93(2) to different adjoining terminals 42, source power can be supplied simultaneously to the terminals 78a and 78b of the accessory 78(1) by way of a plurality of paths.

That is, as shown in FIG. 8A or FIG. 8B, one terminal on the accessory side can be simultaneously connected to a plurality of terminals 42 on the side of the fuse bus bar 41 in parallel. For example, even when the current per terminal 42 is fixed to 5 [A], a current of a total of 10 [A] can flow by simultaneously connecting to two terminals 42.

Moreover, by controlling ON and OFF of the transistors 93(1) to 93(4) of the circuits used for connection, the number of terminals, of a plurality of connected terminals 42, used for actual energization can be limited. Thereby, the power supplied from the backbone structures to the accessories can be controlled. For example, while a current of 15 [A] can flow when three terminals 42 are physically connected to one power supply input terminal of one accessory by way of three transistors 93, by turning off one of the connected three transistors 93, the actually supplied current can be limited to 10 [A].

Since the above-described circuit for a vehicle can be structured by combining the first base circuit 210, the second base circuit 220, the additional part circuit 230 and the like each having a simple structure, for example, as shown in FIG. 1D, the overall structure can also be simplified, so that manufacture is facilitated.

Moreover, while the structure and specifications of the additional part circuit 230 are changed according to the difference in vehicle type and the optional electric component, by connecting the desired branch lines 232 to 235 to the trunk line of the backbone structure 231 having the common structure as shown in FIG. 1C, manufacture can be performed so as to satisfy the required structure and specifications.

Moreover, since even when the structure of the backbone structure 231 is simplified and the connection specifications of the portions such as the terminals 42 are unified as shown in FIG. 8A and FIG. 8B, the source power supplied to the accessories connected thereto can be appropriately controlled, the kinds and article numbers of the parts being used can be reduced, so that reduction in part cost and manufacturing cost is realized.

Now, features of the above-described embodiment of the circuit for a vehicle according to the present invention is briefly summarized and listed in the following [1] to [6]:

[1] A circuit (250) for a vehicle routed on a vehicle, comprising:

a first circuit (the additional part circuit 230) having a trunk line (the backbone structure 231) and a branch line (232-235) detachably attachable to the trunk line; and a second circuit (the first base circuit 210) having a plurality of electric wires, wherein the trunk line and the branch line respectively include power supply lines (the routing conductive members 20a, 20b, 30a, 30c, 40a, 40c) and communication lines (the routing conductive members 20d, 20e, 30d, 30e, 40d, 40e).

[2] The circuit for a vehicle according to the above [1], wherein the first circuit has a branch portion (the branch and connection boxes 21, 22, 23, 46) for connecting the branch lines to the trunk line, the branch portion including a lower level control portion (the slave control portions 51c, 52c, 53c); and a higher level control portion (the electronic control units 11, 12, 13) that is connected to the trunk line, controls distribution of power to be supplied to the branch lines based on communication with the lower level control portion and controls the lower level control portions.

[3] The circuit for a vehicle according to the above [2], wherein to the branch portion, a plurality of above branch lines are connectable in parallel, and the lower level control portion has a switching circuit (44) that switches connection between the power supply lines and the communication lines of the trunk line and the branch lines according to the power to be supplied to an accessory connected to the connected branch line.

[4] The circuit for a vehicle according to the above [3], wherein the switching circuit has one or more than one selecting switch device (92, 94) that selectively interconnects any one of a power supply terminal capable of power supply, a ground terminal connectable to a ground line and a communication terminal connectable to the communication lines and one common terminal of the trunk line; and a programmable control device (the FPGA device 91) that controls at least a connection condition of the communication terminal.

[5] The circuit for a vehicle according to the above [4], wherein the switching circuit includes switching elements (the transistors 93 and 95) that control power supply to the power supply terminal, and the control device controls the switching elements according to the power to be supplied to the accessory connected to each of the branch lines.

[6] The circuit for a vehicle according to the above [1], wherein the first circuit is an optional circuit (the additional part circuit 230) selected according to a plurality of vehicle types, grades or options, and the second circuit is a standard circuit (the first base circuit 210) used commonly to a plurality of vehicle types, grades or options.

While the present invention has been described in detail and with reference to a specific embodiment, it is obvious to one of ordinary skill in the art that various changes and modifications may be added without departing from the spirit and scope of the present invention.

What is claimed is:

1. A circuit for a vehicle routed on a vehicle, comprising:
a first circuit having a trunk line and a branch line detachably attachable to the trunk line; and
a second circuit having a plurality of electric wires,
wherein the trunk line and the branch line respectively include power supply lines and communication lines,
wherein the first circuit has
a branch portion for connecting the branch line to the trunk line, the branch portion connected to a lower level control portion b the branch line; and
a higher level control portion that is connected to the trunk line controls distribution of power to be supplied to the branch line based on communication with the lower level control portion and controls the lower level control portions, wherein the higher level control portion is connected to the lower level control portion b the branch line and the trunk line and communicates with the lower level control portion using the branch line and the trunk line.

2. A circuit for a vehicle routed on a vehicle, comprising:
a first circuit having a trunk line and a branch line detachably attachable to the trunk line; and
a second circuit having a plurality of electric wires,
wherein the trunk line and the branch line respectively include power supply lines and communication lines,
wherein the first circuit has
a branch portion for connecting the branch line to the trunk line, the branch portion including a lower level control portion;
a higher level control portion that is connected to the trunk line controls distribution of power to be supplied to the branch line based on communication with the lower level control portion and controls the lower level control portions,
wherein to the branch portion, a plurality of the branch lines are connectable in parallel, and
wherein the lower level control portion has a switching circuit that switches connection between the power supply lines and the communication lines of the trunk line and the branch lines according to the power to be supplied to an accessory connected to the connected branch line.

3. A circuit for a vehicle according to claim 2,
wherein the switching circuit has one or more than one selecting switch device that selectively interconnects any one of a power supply terminal capable of power supply, a ground terminal connectable to a ground line and a communication terminal connectable to the communication lines and one common terminal of the trunk line; and a programmable control device that controls at least a connection condition of the communication terminal.

4. A circuit for a vehicle according to claim 3,
wherein the switching circuit includes switching elements that control power supply to the power supply terminal, and
the control device controls the switching elements according to the power to be supplied to the accessory connected to each of the branch lines.

5. A circuit for a vehicle according to claim 1,
wherein the first circuit is a circuit selected according to a plurality of vehicle types, grades or options, and
the second circuit is a standard circuit used commonly to a plurality of vehicle types, grades or options.

* * * * *